Feb. 12, 1924.
W. L. BLISS
1,483,568
VALVE OPERATING MECHANISM
Filed Sept. 9, 1918
3 Sheets-Sheet 1
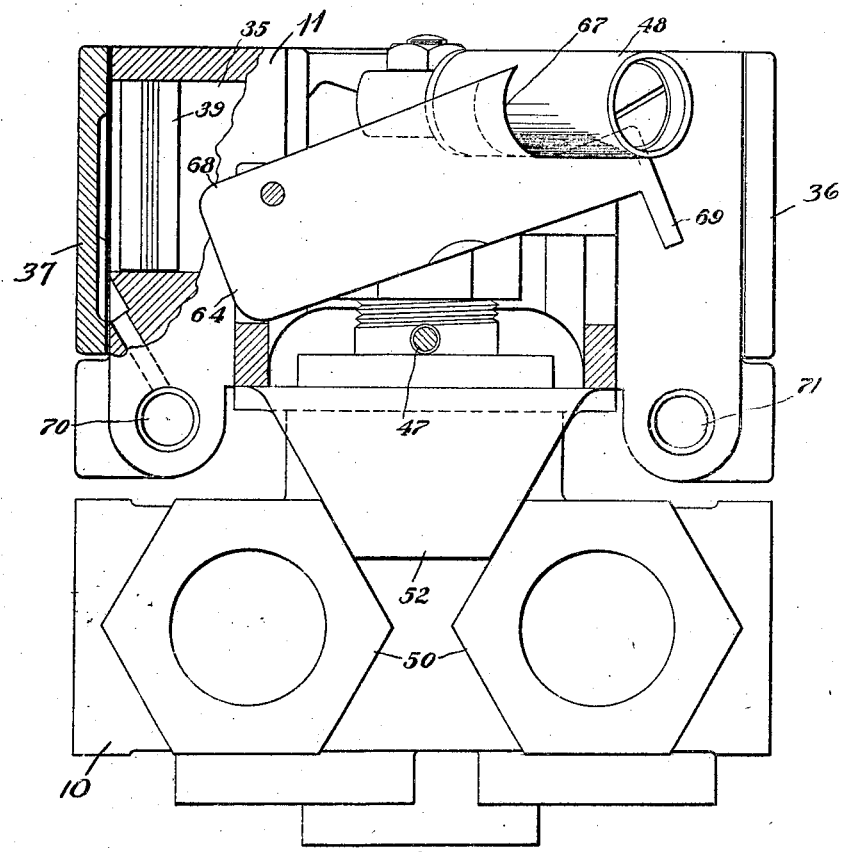
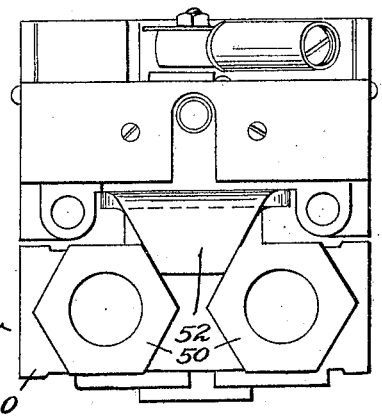
WITNESS:
George T. Brusch
Ralph Munden
INVENTOR.
William L. Bliss
BY
ATTORNEY.

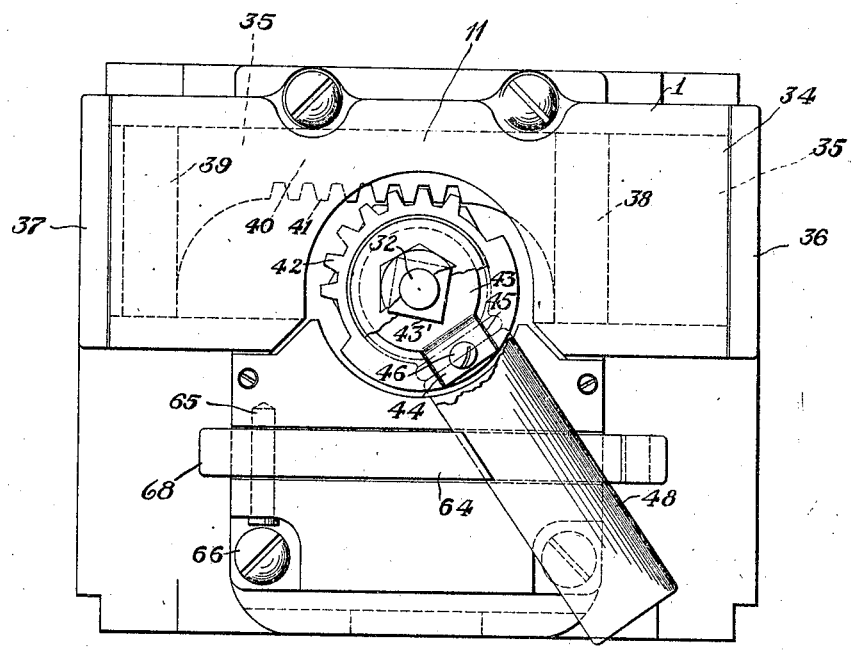
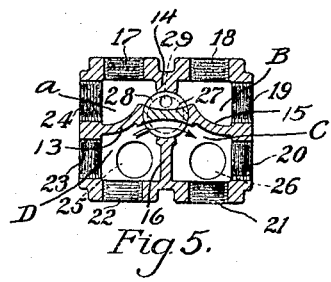
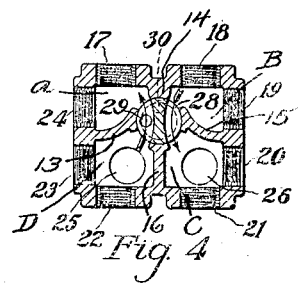

Patented Feb. 12, 1924.

1,483,568

UNITED STATES PATENT OFFICE.

WILLIAM L. BLISS, OF NIAGARA FALLS, NEW YORK, ASSIGNOR TO VAPOR CAR HEATING COMPANY, INC., OF CHICAGO, ILLINOIS, A CORPORATION OF NEW YORK.

VALVE-OPERATING MECHANISM.

Application filed September 9, 1918. Serial No. 253,162.

*To all whom it may concern:*

Be it known that I, WILLIAM L. BLISS, a citizen of the United States, residing at Niagara Falls, in the county of Niagara and State of New York, have invented new and useful Improvements in Valve-Operating Mechanism, of which the following is a specification.

My invention relates to a valve, for example, to a valve for controlling the circulation of steam through a heating system, and to mechanism for opening and closing said valve.

The principal object of the invention is to provide a mechanism which operates automatically to move the valve to a certain position, for example, to the open position, when a high pressure is created in a conduit forming part of the controlling apparatus, a conduit, for example, adapted to receive air under pressure, and to automatically move the valve to another position, namely, the closing position, when the pressure in such conduit is diminished, for instance, is reduced to atmospheric pressure; and furthermore, to provide for opening the valve by manual operation and for holding it open during low pressure periods by means of a device which, however, is made ineffective as soon as the high pressure in the air conduit is restored so that when the air pressure is again reduced the valve will be closed automatically.

The invention has for further objects such other, new and improved constructions and combinations of parts and devices relating to motor-controlled valves as will be hereinafter described and claimed for carrying out the above stated objects and such other objects as will appear from the following description.

A preferred embodiment of the invention is illustrated in the accompanying drawings, wherein—

Fig. 1 is a view in elevation of a motor controlled valve, made in accordance with my invention.

Fig. 2 is a similar view made on a large scale showing certain parts in section for the purpose of clearness.

Fig. 3 is a plan view in elevation of the structure shown in Fig. 2.

Fig. 4 is a sectional plan, on a reduced scale, of the valve in its open position.

Fig. 5 is a view similar to Fig. 4 showing the valve in its closed position.

Like characters of reference designate like parts in the several figures of the drawings.

Figure 6:
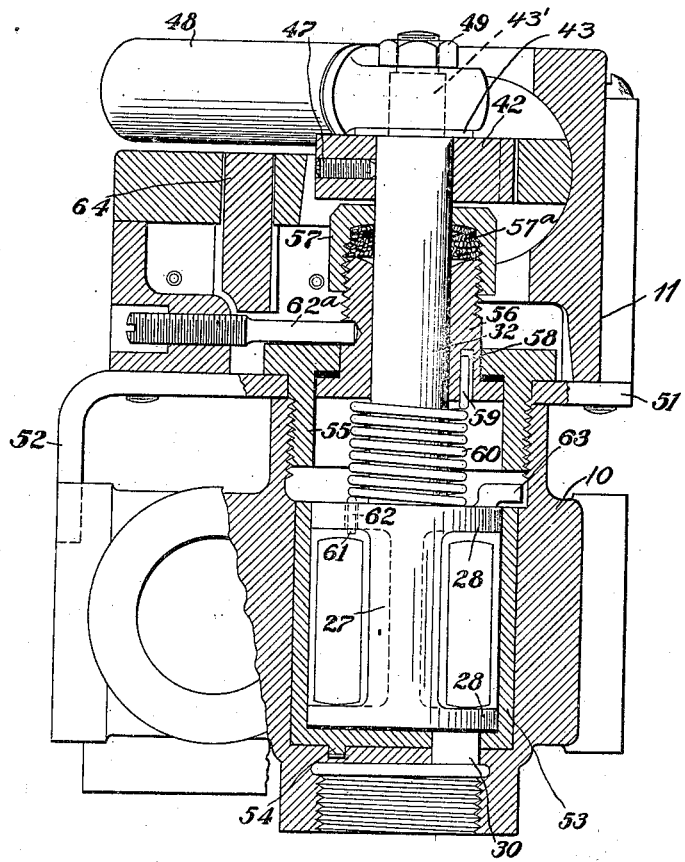
Fig. 6 is a vertical section through the valve and operating mechanism shown in Fig. 2.

In the drawings I have shown my improved motor operated valve mechanism as consisting of a valve structure, designated generally by the reference numeral 10 and a reciprocating fluid pressure motor, designated generally by the reference character 11, supported in a position above said valve structure, and so connected therewith that operation of the motor imparts movement to the movable element or valve 27.

The valve structure consists of a casing, separated, by partitions 13, 14, 15 and 16, into chambers A, B, C and D. The casing is provided with a number of ports 17, 18, 19, 20, 21, 22, 23, 24, 25 and 26, communicating with certain of said chambers and are so disposed as to permit the casing to be connected with different arrangements of pipes (not shown). The ports above mentioned not being used by any particular arrangement of piping, will be plugged up. For the purpose of convenience, it will be assumed in the description of the valve that all of said ports are plugged up except ports 17, 18, 25 and 26. A valve 27 of the vane type is positioned in said casing so as to be moved to register with the ends of the partitions 14—16 and 13—15, respectively, to establish communication between certain of said chambers in pairs. The valve 27 is preferably formed with a pair of cylindrical shoulders 28 illustrated more completely in Fig. 6. The lower shoulder 28 is provided with a vent hole 29 adapted to communicate with a vent hole 30 in the valve casing when the valve 27 is in the position illustrated in Fig. 5. The said vent hole 30 of the casing communicates with the atmosphere and thereby provides a suitable drain for condensation of steam, when the valve is used in connection with steam heating, or in other situations where condensation is likely to occur in the system of piping when the valve is in its closed position. When the valve 27 is in the position illustrated in Fig. 4, the port 25 is in communication with port 17 and the port 18 is in communication with the port 26. With such condition of the valve the steam, or other fluid, will pass from the port 25 into chamber D, thence through the valve passage and into the chamber A, from which it will pass through port 17, the system of piping to the return port 18, chambers B and C, to discharge port 26. In this position of the valve it will be noted the vent hole 29 is out of register with the corresponding vent hole 30 of the valve casing, thereby closing the latter to prevent escape of the steam or other fluid passing through the valve casing. When the valve 27 is in the position indicated in Fig. 5 the inlet and discharge ports 25 and 26, respectively, are in direct communication and the ports 17 and 18 are in direct communication through chambers A and B. The vent hole 29 of the valve is shown in this figure as registering with the vent hole 30 of the valve casing so as to permit the discharge of water of condensation or other fluid desired to be drained out of the system or piping when said valve is in its closed position. It will be apparent from the arrangement of ports shown in Figs. 4 and 5, that the port 25 represents the inlet of the valve casing, 26 the outlet port, 17 the port leading into the system of piping with which said valve casing is attached, for example, a steam radiator or the like. 18 represents the return end of said system of piping, and 26 represents the discharge port leading to the atmosphere or other pipes or devices associated with the particular system of piping with which said valve is used.

The valve 27 is provided with a stem 32 which extends through a packing gland consisting of a sleeve member 56 and a cap member 57. The said sleeve and cap members have a threaded engagement with each other and provide a pocket for the packing material 57$^a$. The lower end of the sleeve member 56 of the packing gland is provided with a flange which fits within a collar 55, the latter being screwed into the top portion of the valve casing 10.

The valve may be automatically rotated in opposite directions by any suitable mechanism. In the embodiment of the invention shown in the drawings the valve is moved to its open position by air pressure and is biased or moved to its closed position by means of a coil spring 60 surrounding the stem 32 and connected with the packing gland 56 and the valve 27. The spring 60 is connected with said members 56 and 27 by means of an upturned portion 59 of the spring extending into a hole 58 formed in the member 56 and a downturned portion 61 of the spring extending into a hole 62 formed in the valve. In addition to moving the valve to its closing position, the spring 60 functions to hold the valve down against its seat and holds the packing gland 56 up against the inner flange of the collar member 55 so as to maintain a fluid-tight joint. With this construction the spring 60 may be put under proper tension by turning the packing gland member 56 in the collar 55. The member 56 is held against reverse movement by means of a screw threaded pin 62$^a$ extending through a threaded opening in the motor frame. If desired, the valve may be provided with a lug 63 adapted to cooperate with abutments (not shown) to limit the angular travel of the valve. The valve is normally closed by the action of the spring 60 and may be opened manually by means of a handle 48 mounted upon a squared portion 43' of the valve stem 32. Said handle is preferably held in place on said stem by means of a nut 49.

In order to latch the valve in its open position, when the same is operated manually, I preferably provide a latch bar 64 pivoted at one end on a pin 65. The latch bar is provided with a notch 67 adapted to engage with the handle 48 when the latch bar is raised to the position shown in Fig. 2. When the valve 27 is opened and the handle 48 engaged with the notch 67 of the latch bar, the tendency of the spring 60 to move the valve to its closed position, will hold the latch bar in its elevation position and thereby prevent the closing of the valve. The latch bar is arranged so that it will drop out of engagement with the handle 48 when the said handle is moved toward the right a short distance from its position in Figs. 2 and 3. The latch bar is preferably provided with portions 68 and 69 which serve as finger holds whereby the latch may be conveniently operated.

The reference numeral 53 designates a lining arranged adjacent the ends of the partitions 13, 14, 15 and 16 of the valve casing which lining provides suitable bearing surfaces for the valve 27. The lining is provided with apertures communicating with the various chambers A, B, C and D of the valve casing and may be prevented from turning within the casing, by means of a lug 54, which fits within a recess in the bottom of the valve casing. The bottom of the lining is provided with an aperture which registers with the vent 30 in the bottom of the valve casing when the lining is in its proper position.

The valve 27 may be opened manually, as above described, or by means of a motor operated by compressed air or other motive means. The motor, indicated as a whole by the numeral 11 is mounted upon a supporting frame 51 attached to the valve casing 10 by an outer flange of the collar member 55. The supporting frame 51 is provided with a downturned lip portion 52 adapted to fit between certain of the bosses surrounding the ports 17 to 24 inclusive of the valve casing so as to maintain the spring in a fixed position.

The motor 11 includes a cylinder 34 which provides a pair of bores 35, 35 having their axes in alignment. End heads 36 and 37 are provided at the ends of the bores 35, 35, whereby to provide closed cylinders. Pistons 38 and 39 are mounted within the bores 35, 35 and connected by a member 40 which is formed on one side to provide a rack 41. A pinion 42 is mounted upon the valve stem 32 to engage with the rack 41. The pinion 42 need be provided with teeth through only a part of its periphery, for the reason that said pinion will turn through only a part of a circle in its entire travel. The pinion is held against a turning movement with reference to valve stem 32 by means of a locking dog 43. The locking dog 43 is provided with a squared hole to fit over the squared portion 43' of the valve stem 32 and has a depending lip 44 to fit within a slot 45 in the pinion 42. Said dog is preferably secured to said pinion 42 by means of a screw 46. A set screw 47 holds the pinion 42 in its proper position vertically of the valve stem 32.

When connecting the valve and motor structure, the rack 41 is preferably placed substantially central of its travel and the valve 27 placed substantially midway between its closed and open position. With the parts in this position, the pinion 42 together with the locking dog 43 is placed on the valve stem 32. The lip 44 of the locking dog should lie within the slot 45 in the pinion and the squared portion 43' of said spindle will lie within the square hole of the latch dog 43. The valve 27 may then be turned slightly in one direction or the other to permit the teeth of the pinion 42, secured to the valve stem, to mesh with the rack 41. The locking dog and slot arrangement above described have the advantage that it is simple and forms a convenient locating means, whereby very little discretion is required on the part of a workman in assembling the device. Any other means for accomplishing the same result, may, of course, be utilized. A port 71 (Fig. 2) communicates with the space between the piston 38 and the cylinder head 36 (Fig. 3) and is adapted to be connected to a source of fluid under pressure, air pressure, for example, the introduction of which into the space between the piston 38 and cylinder head 36 will move the pistons 38 and 39 to the position indicated in Fig. 3, thereby rotating the handle 48 in a counter clockwise direction, to open the valve 27. A port 70 communicates with the space between the piston head 29 and cylinder head 37. This port is normally open so as to avoid compression in the space between the piston head 39 and cylinder head 37.

In operation the valve 27 may be subjected to automatic control at any time by introducing fluid under pressure into the space between the piston head 38 and cylinder head 36, thereby moving the handle 48 of the valve slightly to the right of Fig. 2 and Fig. 3, so as to permit the latch bar 64 to drop to its inoperative position. The valve 27 will then be held open by reason of the pressure within the cylinder. As soon as this pressure is relieved, the spring 60 is effective to return the valve 27 to its closed position. If desired, both ports 71 and 70 may be connected with the source of fluid under pressure and the valve 27 operated in forward and reverse direction by alternately directing the fluid into the motor cylinder at opposite ends of the piston. With such connection the spring 60 should be disconnected from the packing gland member 56 and the valve 27 so that it will function only to hold the valve down upon its seat and hold the packing gland member 56 up against the collar 55

What I claim as new and desire to secure by Letters Patent of the United States is—

1. In a valve mechanism of the character described, a valve, means biasing said valve to obstructing position, valve holding means biased to inoperative position, said valve biasing means being adapted to co-operate with said valve holding means for maintaining said holding means in operative position, and fluid pressure means for overcoming said valve biasing means to effect a release of said holding means.

2. In apparatus of the character described, a movable member, means biasing said member to a certain position, holding means for said member biased to inoperative position, said biasing means for said member being adapted to co-operate with said holding means for maintaining said holding means in operative position, and fluid pressure means for overcoming said biasing means to permit said holding means to move out of operative position.

3. In apparatus of the character described, a valve casing, a valve having a stem projecting from said casing, means for moving said valve to closing position, holding means normally inoperative adapted to be positioned manually to hold said valve in its open position, and a fluid pressure reciprocating motor for operating said valve.

4. In apparatus of the character described, a valve casing, a valve having a stem projecting from said casing, means for moving said valve to closing position, holding means normally inoperative adapted to be positioned manually to hold said valve in its open position, short of its extreme opening movement, and a fluid pressure reciprocating motor adapted when operated to move said valve to its extreme open position, whereby said holding means is released from its operative position and the said valve moving means is again effective to close said valve upon the fall of pressure in said motor.

5. In a valve mechanism of the character described, a valve casing, a rotary valve in said casing provided with an operating stem, a packing gland member surrounding said stem, a coiled spring engaged at one end with said gland member, and at the other end with said valve, said gland member being adapted to be rotated to effect an initial tensioning of the said spring whereby said spring will operate to move said valve to its closing position, and means for holding said gland member against rotation.

6. In apparatus of the character described, the combination of a valve casing, a valve, a conduit containing a fluid subject to increase and decrease of pressure, means automatically operating to move said valve alternately to opening and closing positions dependent upon increase and decrease of pressure in said conduit, and manually controlled means whereby, at low pressure in said conduit, said valve may be moved to and maintained in one such position, which means is made ineffective when high pressure is re-established in said conduit so that thereafter the movements of the valve are subject to automatic control in both directions.

7. In apparatus of the character described, the combination of a valve casing, a valve, a conduit containing a fluid subject to increase and decrease of pressure, means operating automatically to move said valve to open position on increase of pressure in said conduit and to closing position when said pressure is decreased, and manually controlled means whereby at low pressure in said conduit said valve may be moved to and maintained in open position, which means is made ineffective when said high pressure is re-established in said conduit so that thereafter the movements of the valve are subject to automatic control in both directions.

In witness whereof, I have hereunto subscribed my name.

WILLIAM L. BLISS.